United States Patent
Patera et al.

(10) Patent No.: US 10,113,455 B2
(45) Date of Patent: Oct. 30, 2018

(54) REGULATOR ASSEMBLY

(71) Applicant: Caterpillar Inc., Peoria, IL (US)

(72) Inventors: Bradley J. Patera, West Lafayette, IN (US); Daniel S. Brandt, Glendale, CA (US); Jared L. Niccum, Lafayette, IN (US); Corey E Baxter, Valparaiso, IN (US)

(73) Assignee: Caterpillar Inc., Deerfield, IL (US)

( * ) Notice: Subject to any disclaimer, the term of this patent is extended or adjusted under 35 U.S.C. 154(b) by 166 days.

(21) Appl. No.: 15/371,531

(22) Filed: Dec. 7, 2016

(65) Prior Publication Data
US 2018/0156082 A1     Jun. 7, 2018

(51) Int. Cl.
F01M 1/16    (2006.01)
F01D 25/20   (2006.01)
F02B 39/14   (2006.01)
F16K 11/072  (2006.01)

(52) U.S. Cl.
CPC .............. F01M 1/16 (2013.01); F01D 25/20 (2013.01); F02B 39/14 (2013.01); F16K 11/072 (2013.01)

(58) Field of Classification Search
CPC .......... F02B 29/04; F02B 37/16; F02B 43/10; F02B 2043/103; F02M 35/10144; F02M 35/10157; F02M 35/10255; F02M 35/10295; F02M 35/104; F02M 35/16; Y02T 10/144; Y02T 10/146; Y10T 137/7847; Y10T 137/7848; Y10T 137/786; Y10T 137/7923; F16K 15/063; F16K 15/16

USPC ............. 60/605.3; 123/41.08, 41.34, 190.16, 123/188.8, 188.17; 137/508, 510, 513.3, 137/513.5, 516.13, 536
See application file for complete search history.

(56) References Cited

U.S. PATENT DOCUMENTS

| | | | |
|---|---|---|---|
| 4,424,738 A * | 1/1984 | Leighton | F16K 17/044 137/116.5 |
| 5,018,601 A | 5/1991 | Waddington et al. | |
| 5,024,200 A | 6/1991 | Free et al. | |
| 6,047,728 A * | 4/2000 | Eidsmore | G05D 16/0616 137/505.42 |
| 7,963,033 B2 | 6/2011 | Squires | |
| 8,695,339 B2 | 4/2014 | Spix | |
| 8,702,548 B2 | 4/2014 | Moorman | |
| 9,068,535 B2 * | 6/2015 | Graichen | F02M 25/0709 |

(Continued)

*Primary Examiner* — Patrick Maines
*Assistant Examiner* — Dapinder Singh

(57) ABSTRACT

A regulator assembly having a main body is provided. The main body includes a first passage extending from a first end and a second passage extending from the first passage towards a second end. The main body also includes a seat defined between the first passage and the second passage. The regulator assembly also includes a valve element. The valve element includes a head portion having a projection. The projection includes a plurality of apertures provided therethrough. The valve element further includes an internal channel. The regulator assembly further includes a spring element. Direct fluid communication between the plurality of apertures of the valve element and the first passage of the main body is discontinued when the head portion is in contact with the seat; and is in direct fluid communication with the first passage of the main body when the valve element is not in contact with the seat.

20 Claims, 7 Drawing Sheets

(56) References Cited

U.S. PATENT DOCUMENTS

| | | | |
|---|---|---|---|
| 9,291,094 B2 * | 3/2016 | Graichen | F16K 31/0648 |
| 9,879,799 B2 * | 1/2018 | Matteucci | F16K 47/04 |
| 2005/0061289 A1 | 3/2005 | Plenzler et al. | |
| 2013/0340428 A1 * | 12/2013 | Graichen | F02M 25/0709 |
| | | | 60/605.2 |
| 2014/0124055 A1 * | 5/2014 | Fontaine | F16K 47/04 |
| | | | 137/377 |
| 2016/0040591 A1 | 2/2016 | Koyanagi et al. | |

* cited by examiner

REGULATOR ASSEMBLY

TECHNICAL FIELD

The present disclosure relates to a regulator assembly. More particularly, the present disclosure relates to the regulator assembly associated with a lubrication system of an engine.

BACKGROUND

Generally, components of an engine, such as a turbocharger, require lubrication for efficient operation thereof. The lubrication may be provided using a lubricant supplied by a lubrication system of the engine. One or more supply parameters of the lubricant, such as a pressure and a flow rate thereof, may have to be controlled accurately in order to effectively lubricate required portions of the turbocharger. Also, the supply parameters of the lubricant may change and may require active control based on change in working parameters of the turbocharger.

For example, during low engine speed, the turbocharger may require the lubricant supply at a low pressure and/or a low flow rate. Similarly, as the engine speed may increase, the turbocharger may require the lubricant supply at a higher pressure and/or a higher flow rate. Currently used systems require complex circuitry and components in order to actively control one or more components associated with the lubrication system, such as a valve, a lubrication pump, and so on, in order to maintain the required supply parameters of the lubricant. Such systems may add substantial cost and complexity to the existing system.

U.S. Patent Application Number 2005/0061289 describes a lubrication system for an internal combustion engine. The lubrication system includes a pressure regulator to optimize oil flow through an engine to increase engine efficiency. The lubrication system includes an engine driven oil pump connected to supply pressurized oil through a main oil feed to a main bearing gallery, a cam gallery and a hydraulically actuated device such as a cam phaser or switching valve lifters. A pressure regulator connected between the main oil feed and the galleries selectively restricts oil flow to the galleries to raise oil pressure supplied to the hydraulically actuated device. The increased oil pressure to the cam phaser allows the engine to use a smaller oil pump and thereby increase engine efficiency while providing for actuation of the cam phaser over the full engine speed range. The increased oil pressure to the switching lifters allows the engine to reduce valve lift or disable cylinders over the full engine speed range.

SUMMARY OF THE DISCLOSURE

In an aspect of the present disclosure, a regulator assembly is provided. The regulator assembly includes a main body. The main body includes a first end and a second end distal with respect to the first end. The main body includes a first passage extending from the first end at least partially towards the second end. The main body also includes a second passage axially aligned with, connected to, and extending from the first passage towards the second end. The second passage has a diameter greater than a diameter of the first passage. The main body further includes a seat defined at an intersection of the first passage and the second passage. The main body is configured to be coupled to a fluid line at the first end and the second end. The regulator assembly also includes a valve element configured to be disposed within the second passage of the main body. The valve element is configured to move within the second passage. The valve element includes a head portion configured to engage with the seat of the main body. The head portion includes a projection having a first surface and a second surface. The projection includes a plurality of apertures provided through the first surface. The valve element also includes a tail portion distal with respect to the head portion. The valve element further includes an internal channel extending between the head portion and the tail portion. The internal channel is configured to provide fluid communication between the head portion and the tail portion. The internal channel is provided in fluid communication with the plurality of apertures. The regulator assembly further includes a spring element provided within the second passage and in contact with the second surface of the projection of the head portion. The spring element is configured to move the valve element within the second passage. Direct fluid communication between the plurality of apertures of the valve element and the first passage of the main body is discontinued when the head portion is in contact with the seat. The plurality of apertures of the valve element is in direct fluid communication with the first passage of the main body when the valve element is not in contact with the seat.

In another aspect of the present disclosure, a lubrication system is provided. The lubrication system includes a fluid line configured to allow a flow of a lubricant therethrough. The lubrication system also includes a regulator assembly provided in the fluid line. The regulator assembly includes a main body. The main body includes a first end and a second end distal with respect to the first end. The main body includes a first passage extending from the first end at least partially towards the second end. The main body also includes a second passage axially aligned with, connected to, and extending from the first passage towards the second end. The second passage has a diameter greater than a diameter of the first passage. The main body further includes a seat defined at an intersection of the first passage and the second passage. The main body is configured to be coupled to the fluid line at the first end and the second end. The regulator assembly also includes a valve element configured to be disposed within the second passage of the main body. The valve element is configured to move within the second passage. The valve element includes a head portion configured to engage with the seat of the main body. The head portion includes a projection having a first surface and a second surface. The projection includes a plurality of apertures provided through the first surface. The valve element also includes a tail portion distal with respect to the head portion. The valve element further includes an internal channel extending between the head portion and the tail portion. The internal channel is configured to provide fluid communication between the head portion and the tail portion. The internal channel is provided in fluid communication with the plurality of apertures. The regulator assembly further includes a spring element provided within the second passage and in contact with the second surface of the projection of the head portion. The spring element is configured to move the valve element within the second passage. Direct fluid communication between the plurality of apertures of the valve element and the first passage of the main body is discontinued when the head portion is in contact with the seat. The plurality of apertures of the valve element is in direct fluid communication with the first passage of the main body when the valve element is not in contact with the seat.

In yet another aspect of the present disclosure, an engine system is provided. The engine system includes an engine. The engine system also includes a fluid line for the engine. The engine system further includes a regulator assembly provided within the fluid line. The regulator assembly includes a main body. The main body includes a first end and a second end distal with respect to the first end. The main body includes a first passage extending from the first end at least partially towards the second end. The main body also includes a second passage axially aligned with, connected to, and extending from the first passage towards the second end. The second passage has a diameter greater than a diameter of the first passage. The main body further includes a seat defined at an intersection of the first passage and the second passage. The main body is configured to be coupled to the fluid line at the first end and the second end. The regulator assembly also includes a valve element configured to be disposed within the second passage of the main body. The valve element is configured to move within the second passage. The valve element includes a head portion configured to engage with the seat of the main body. The head portion includes a projection having a first surface and a second surface. The projection includes a plurality of apertures provided through the first surface. The valve element also includes a tail portion distal with respect to the head portion. The valve element further includes an internal channel extending between the head portion and the tail portion. The internal channel is configured to provide fluid communication between the head portion and the tail portion. The internal channel is provided in fluid communication with the plurality of apertures. The regulator assembly further includes a spring element provided within the second passage and in contact with the second surface of the projection of the head portion. The spring element is configured to move the valve element within the second passage. Direct fluid communication between the plurality of apertures of the valve element and the first passage of the main body is discontinued when the head portion is in contact with the seat. The plurality of apertures of the valve element is in direct fluid communication with the first passage of the main body when the valve element is not in contact with the seat.

Other features and aspects of this disclosure will be apparent from the following description and the accompanying drawings.

DETAILED DESCRIPTION

Figure 1:
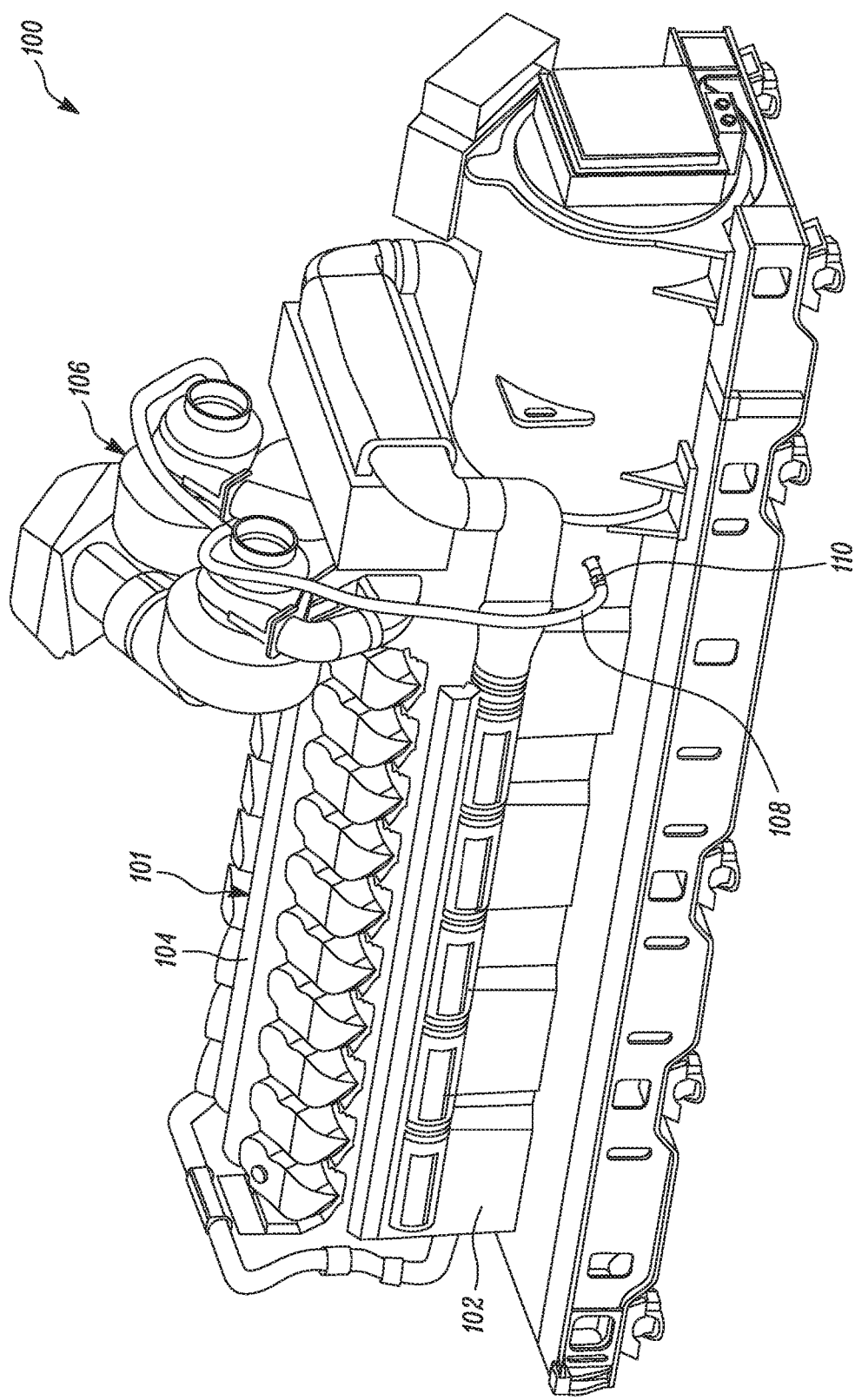
FIG. 1 is a perspective view of an exemplary engine system, according to one embodiment of the present disclosure.

Wherever possible, the same reference numbers will be used throughout the drawings to refer to the same or the like parts. Referring to FIG. 1, an exemplary engine system 100 is illustrated. The engine system 100 includes an engine 101. The engine 101 is an internal combustion engine powered by any fuel known in the art such as gasoline, diesel, natural gas, and so on, or a combination thereof. The engine system 100 may be used for applications including, but not limited to, power generation, transportation, construction, agriculture, forestry, aviation, marine, material handling, and waste management.

The engine 101 includes an engine block 102. The engine block 102 includes one or more cylinders (not shown) provided therein. The cylinders may be arranged in any configuration such as inline, radial, "V", and so on. The engine 101 also includes a cylinder head 104 mounted on the engine block 102. The cylinder head 104 houses one or more components and/or systems (not shown) of the engine 101 such as a valve train, an intake manifold, an exhaust manifold, sensors, and so on. Additionally, the engine 101 may include various other components and/or systems (not shown) such as a crankcase, a fuel system, an air system, a cooling system, an exhaust gas recirculation system, an exhaust aftertreatment system, other peripheries, and so on.

The engine 101 also includes a lubrication system (not shown). The lubrication system provides lubrication to various components of the engine 101, such as a turbocharger 106, the valve train, a crankshaft (not shown), a cam shaft (not shown), bearings (not shown), and so on. The lubrication system includes a lubrication pump (not shown). The lubrication pump may be external or internal to the engine 101. The lubrication pump provides a flow of the lubricant to the various components. The lubrication system also includes a lubrication circuit (not shown) provided within the engine 101.

The lubrication circuit is fluidly coupled between the lubrication pump and the various components. The lubrication circuit may include dedicated paths provided internal and/or external to the engine 101. The lubrication circuit provides the flow of the lubricant from the lubrication pump to the various components. Accordingly, the lubrication system also includes a fluid line 108 coupled between the engine block 102 and the turbocharger 106. It should be noted that the fluid line 108 may be a part of the lubrication circuit and that in some embodiments the fluid line 108 may be directly connected between the lubrication pump and the turbocharger 106. The fluid line 108 allows the flow of the lubricant therethrough to the turbocharger 106 from the engine block 102 or the lubrication pump based on application requirements.

The lubrication system also includes a regulator assembly 110 provided within the fluid line 108. In the illustrated embodiment, the regulator assembly 110 is provided within the fluid line 108 adjacent to the engine block 102. In other embodiments, the regulator assembly 110 may be provided at any location within the fluid line 108, such as adjacent to the turbocharger 106, based on application requirements. Also, it should be noted that the fluid line 108 associated with the lubrication system described herein is merely exemplary. In other embodiments, the fluid line 108 may be associated with any other system of the engine 101, such as the cooling system, the fuel system, and so on.

Figure 2:
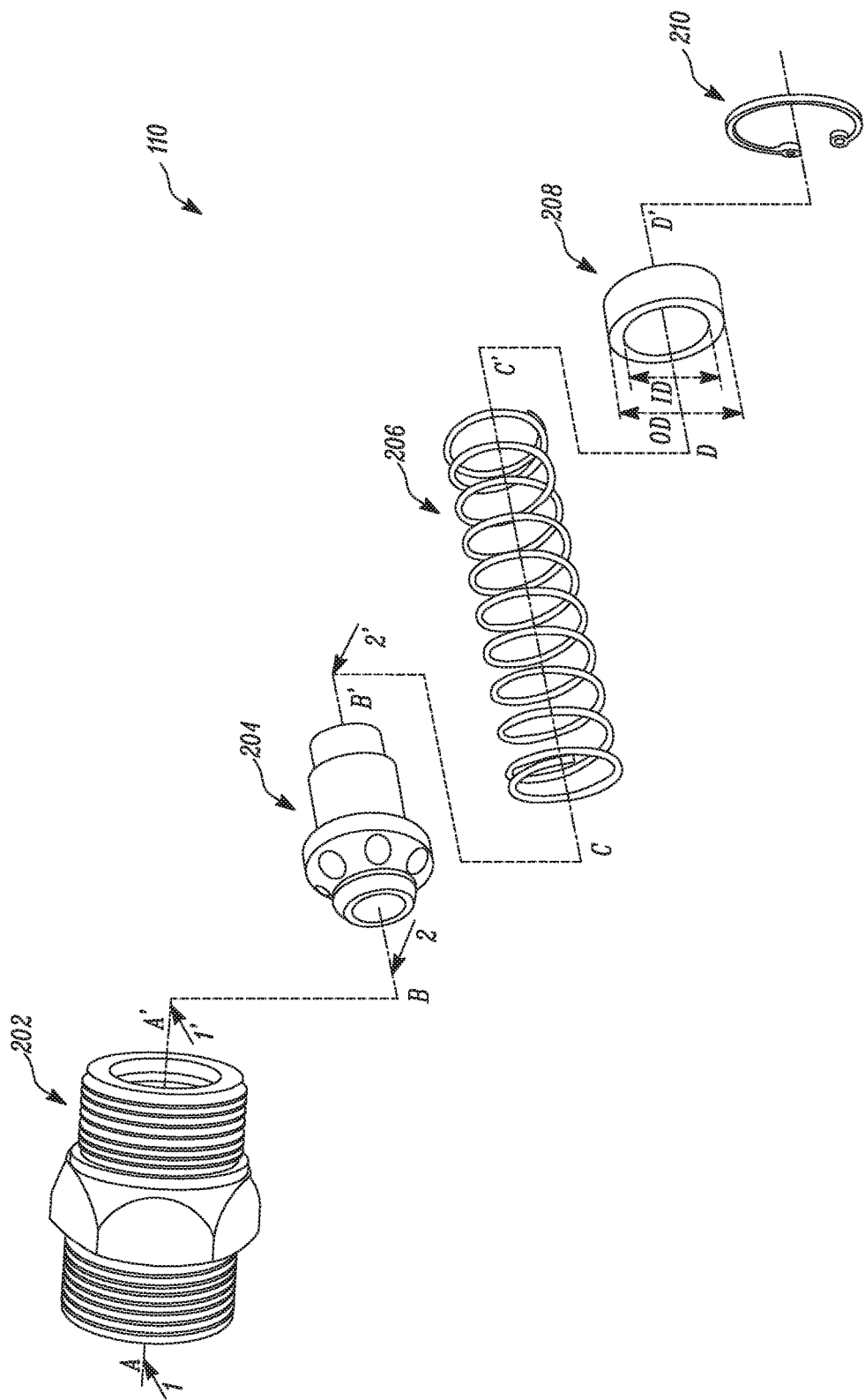
FIG. 2 is an exploded perspective view of a regulator assembly, according to one embodiment of the present disclosure.
Figure 3:
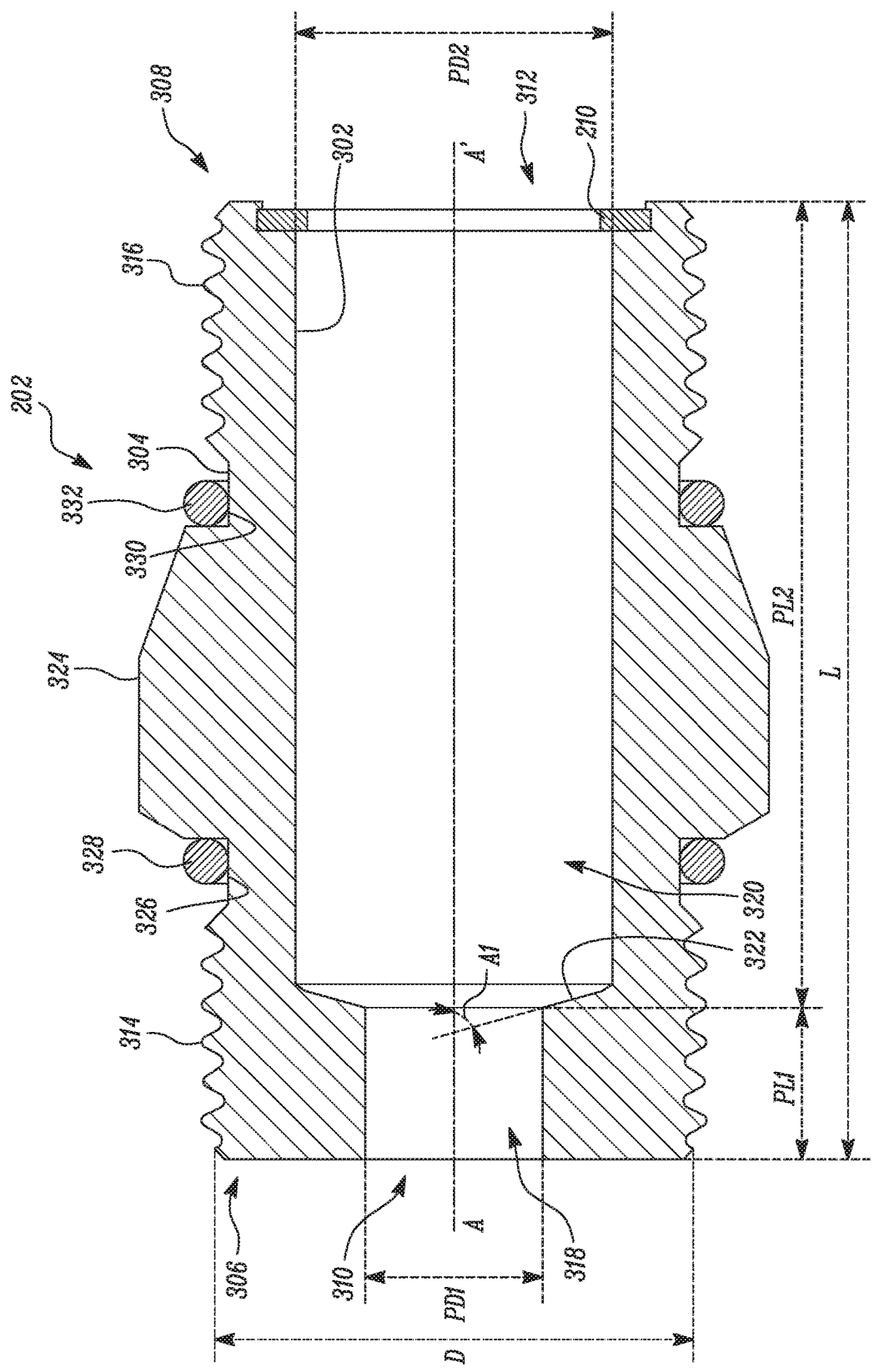
FIG. 3 is a cross sectional view of a main body of the regulator assembly of FIG. 2 along a section 1-1', according to one embodiment of the present disclosure.

Referring to FIGS. 2 and 3, the regulator assembly 110 includes a main body 202. The main body 202 includes a hollow and cylindrical configuration defining an axis A-A'. The main body 202 also defines a diameter "D" and a length "L" thereof. The main body 202 includes an inner surface 302 and an outer surface 304. The outer surface 304 is disposed opposite the inner surface 302. The main body 202 also includes a first end 306 and a second end 308. The second end 308 is distal with respect to the first end 306. The first end 306 includes an inlet portion 310. The inlet portion 310 provides an opening to receive the lubricant within the main body 202. The second end 308 includes an outlet portion 312. The outlet portion 312 provides an opening to allow exit of the lubricant outside the main body 202.

The main body 202 also includes first threads 314 and second threads 316 provided on the first end 306 and the second end 308 respectively. More specifically, the first threads 314 and the second threads 316 are provided on the outer surface 304 of the main body 202. In other embodiments, the first threads 314 and the second threads 316 may be provided on the inner surface 302 of the main body 202 based on application requirements. The first threads 314 and the second threads 316 provide coupling of the first end 306 and the second end 308 of the regulator assembly 110 to the fluid line 108 respectively. Accordingly, the regulator assembly 110 is provided in-line with respect to the fluid line 108. In other embodiments, the main body 202 may be coupled to the fluid line 108 using any other coupling method, such as a coupler (not shown).

The main body 202 includes a first passage 318 provided therein. The first passage 318 extends from the first end 306 at least partially towards the second end 308 of the main body 202. The first passage 318 is provided adjacent to and in fluid communication with the inlet portion 310. The first passage 318 defines a diameter "PD1" and a length "PL1" thereof. The diameter "PD1" and the length "PL1" are smaller than the diameter "D" and the length "L" of the main body 202 respectively. The first passage 318 is axially aligned with respect to the axis A-A'.

The main body 202 also includes a second passage 320. The second passage 320 defines a diameter "PD2" and a length "PL2" thereof. The diameter "PD2" is greater than the diameter "PD1" of the first passage 318 and smaller than the diameter "D" of the main body 202. The length "PL2" is greater than the length "PL1" of the first passage 318 and smaller than the length "L" of the main body 202. Accordingly, the length "L" of the main body 202 is equal to a sum of the length "PL1" of the first passage 318 and the length "PL2" of the second passage 320 ("L"="PL1"+"PL2").

The second passage 320 is axially aligned with respect to the axis A-A' and the first passage 318. Also, the second passage 320 extends from the first passage 318 towards the second end 308. The second passage 320 is fluidly connected to the first passage 318 and the outlet portion 312. Accordingly, the second passage 320 in association with the first passage 318 provides fluid communication between the inlet portion 310 and the outlet portion 312 on the first end 306 and the second end 308 of the main body 202 respectively.

The main body 202 also includes a seat 322 provided on the inner surface 302. The seat 322 is provided proximate with respect to the first end 306 and the inlet portion 310 and distal with respect to the outlet portion 312. Also, the seat 322 is provided at an intersection of the first passage 318 and the second passage 320, such that the first passage 318 graduates into the second passage 320 along the seat 322. Accordingly, the seat 322 is inclined at an angle "A1" with respect to the axis A-A'.

The main body 202 includes a gripping portion 324 provided on the outer surface 304. The gripping portion 324 is provided between the first end 306 and the second end 308 between the first threads 314 and the second threads 316 respectively. In the illustrated embodiment, the gripping portion 324 includes a hexagonal configuration. Accordingly, the gripping portion 324 engages with a tool (not shown), such as a spanner, a pipe wrench, and so on, during coupling of the regulator assembly 110 with the fluid line 108. In other embodiments, the gripping portion 324 may include any other configuration based on application requirements, such as a circular configuration with a knurled surface thereon, and so on.

The main body 202 includes a first groove 326 provided on the outer surface 304 thereof. The first groove 326 is provided between the first threads 314 and the gripping portion 324. The first groove 326 receives a first sealing ring 328 therein. The first sealing ring 328 limits leakage of the lubricant on the first end 306 between the outer surface 304 and the fluid line 108. The main body 202 also includes a second groove 330 provided on the outer surface 304 thereof. The second groove 330 is provided between the second threads 316 and the gripping portion 324. The second groove 330 receives a second sealing ring 332 therein. The second sealing ring 332 limits leakage of the lubricant on the second end 308 between the outer surface 304 and the fluid line 108. The first sealing ring 328 and the second sealing ring 332 may be any sealing element known in the art, such as an O-ring.

Figure 4:
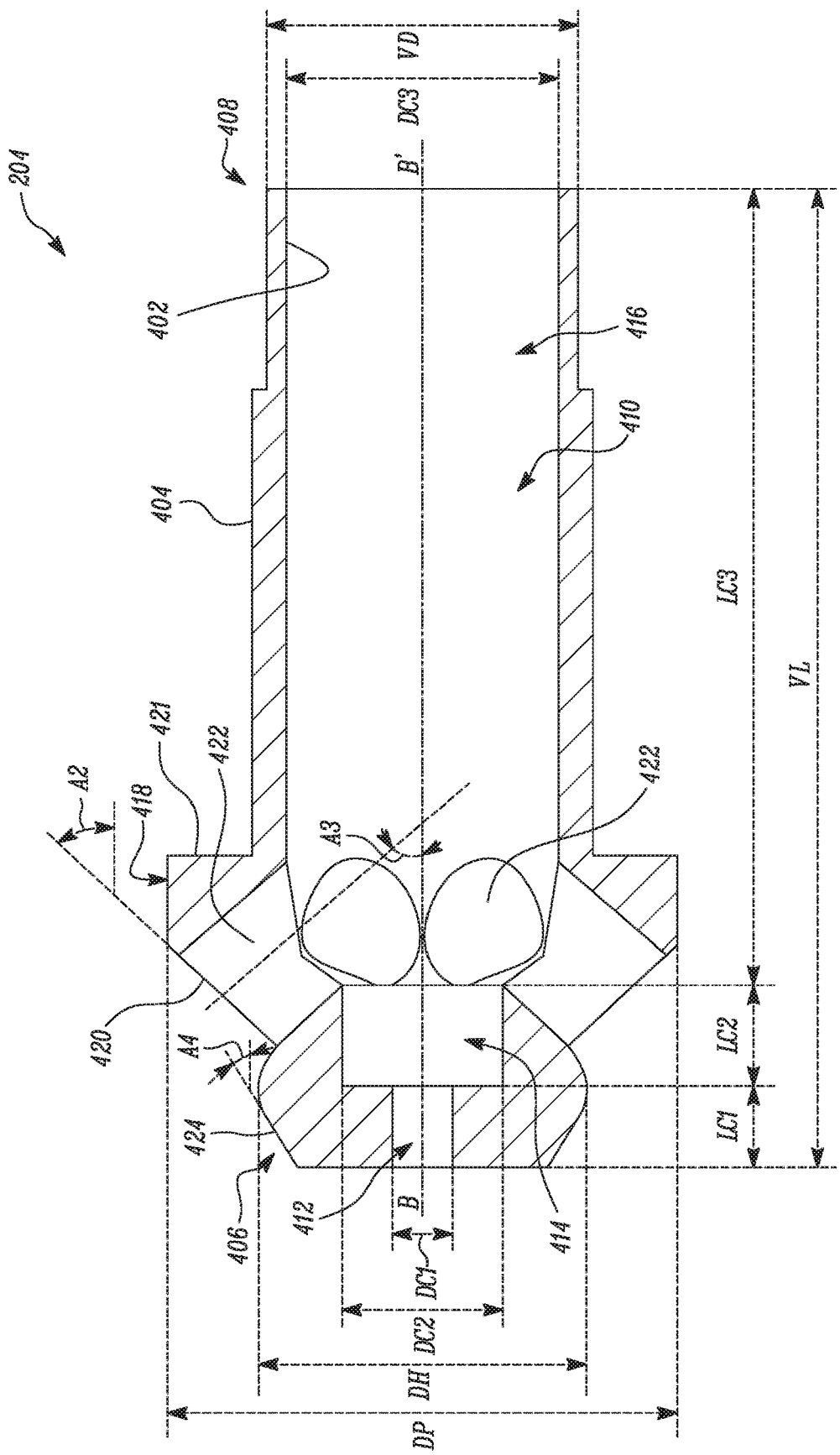
FIG. 4 is a cross sectional view of a valve element of the regulator assembly of FIG. 2 along a section 2-2', according to one embodiment of the present disclosure.

Referring to FIGS. 2 and 4, the regulator assembly 110 includes a valve element 204. The valve element 204 includes a substantially hollow and cylindrical configuration defining an axis B-B'. Accordingly, the valve element 204 includes an inner surface 402 and an outer surface 404 thereof. The valve element 204 defines a length "VL" and a nominal diameter "VD" thereof. The length "VL" and the nominal diameter "VD" is smaller than the length "PL2" and the diameter "PD2" of the second passage 320.

The valve element 204 includes a head portion 406 and a tail portion 408. The head portion 406 defines a diameter "DH" thereof. The diameter "DH" is greater than the diameter "PD1" of the first passage 318 of the main body 202. The tail portion 408 is distal with respect to the head portion 406. The valve element 204 includes an internal channel 410 axially aligned with respect to the axis B-B'. The internal channel 410 extends between the head portion 406 and the tail portion 408 along the length "VL" of the valve element 204. Accordingly, the internal channel 410 provides fluid communication between the head portion 406 and the tail portion 408.

The internal channel 410 includes a varying diameter along the length "VL" of the valve element 204. More specifically, the internal channel 410 includes a first portion 412 defining a first diameter "DC1" and a first length "LC1" thereof. The first portion 412 is proximate with respect to the head portion 406 and distal to the tail portion 408. The internal channel 410 includes a second portion 414 defining a second diameter "DC2" and a second length "LC2" thereof. The second portion 414 is adjacent to and in fluid communication with the first portion 412. The second diameter "DC2" and the second length "LC2" is greater than the first diameter "DC1" and the first length "LC1" of the first portion 412 respectively.

The internal channel 410 also includes a third portion 416 defining a third diameter "DC3" and a third length "LC3" thereof. The third portion 416 is adjacent to the second portion 414. Accordingly, the third portion 416 is provided in fluid communication with the first portion 412 and the second portion 414. The third diameter "DC3" and the third length "LC3" is greater than the second diameter "DC2" and the second length "LC2" of the second portion 414 respectively.

The valve element 204 includes a projection 418 provided on the outer surface 404. The projection 418 is provided circumferentially surrounding the head portion 406. The projection 418 defines a diameter "DP" thereof. The diameter "DP" is approximately equal to the diameter "PD2" of the second passage 320 of the main body 202. The projection 418 includes a first surface 420 and a second surface 421. The first surface 420 is inclined at an angle "A2" with respect to the axis B-B' passing through the internal channel 410 of the valve element 204. The angle "A2" is an acute angle and actual values of the angle "A2" may vary based on application requirements. The second surface 421 is substantially perpendicular with respect to the axis B-B'.

The projection 418 includes a number of apertures 422 provided thereon. Each of the apertures 422 is provided radially spaced apart from one another. Each of the apertures 422 is provided through the first surface 420 and in fluid communication with the third portion 416 of the internal channel 410. Each of the apertures 422 is inclined at an angle "A3" with respect to the axis B-B'.

The valve element 204 also includes an angled surface 424 provided circumferentially on the head portion 406 thereof. The angled surface 424 is provided adjacent to the projection 418. The angled surface 424 defines an angle "A4" with respect to the axis B-B'. The angled surface 424 will be explained in more detail later.

Referring to FIG. 2, the regulator assembly 110 includes a spring element 206. The spring element 206 defines an axis C-C' thereof. The spring element 206 may be any helical compression spring known in the art. The spring element 206 will be explained in more detail later. The regulator assembly 110 also includes an end piece 208. The end piece 208 includes a hollow and cylindrical configuration defining an axis D-D' thereof. Accordingly, the end piece 208 defines an inner diameter "ID" and an outer diameter "OD" thereof.

The inner diameter "ID" is approximately equal to the nominal diameter "VD" of the valve element 204. The outer diameter "OD" is approximately equal to the diameter "PD2" of the second passage 320. The regulator assembly 110 further includes a retention ring 210. The retention ring 210 may be any retaining ring known in the art, such as a circlip. The end piece 208 and the retention ring 210 will be explained in more detail later.

Figure 5:
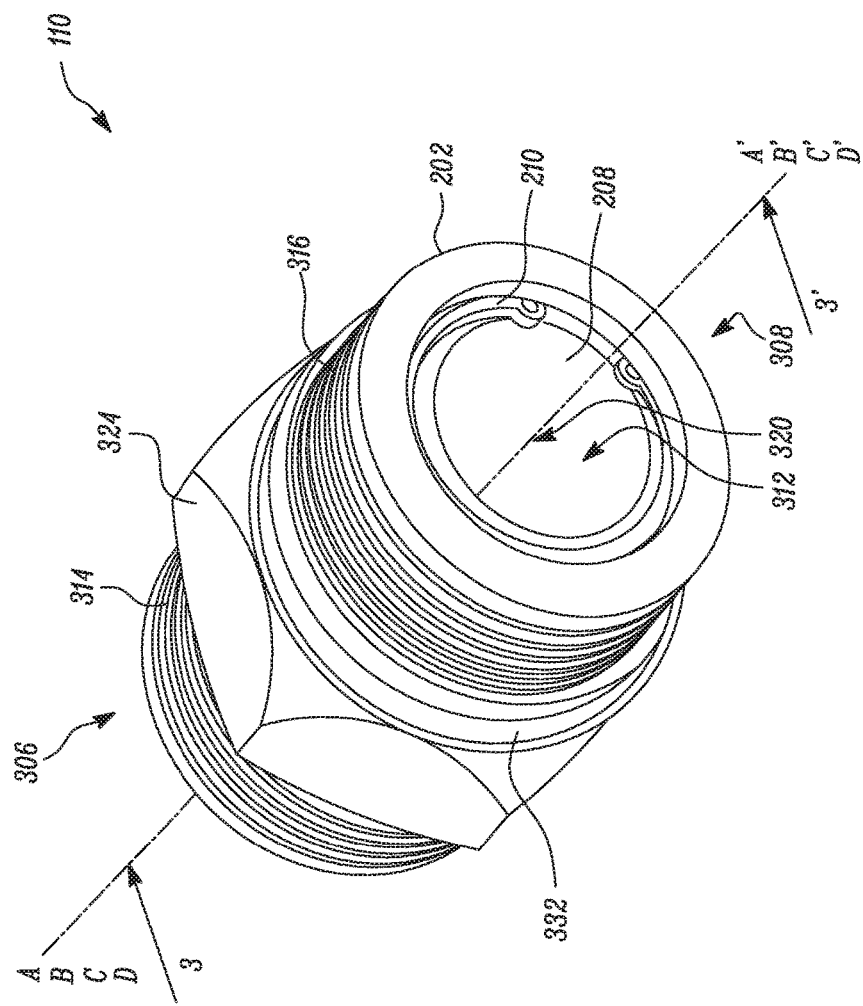
FIG. 5 is an assembled perspective view of the regulator assembly of FIG. 2, according to one embodiment of the present disclosure.
Figure 6:
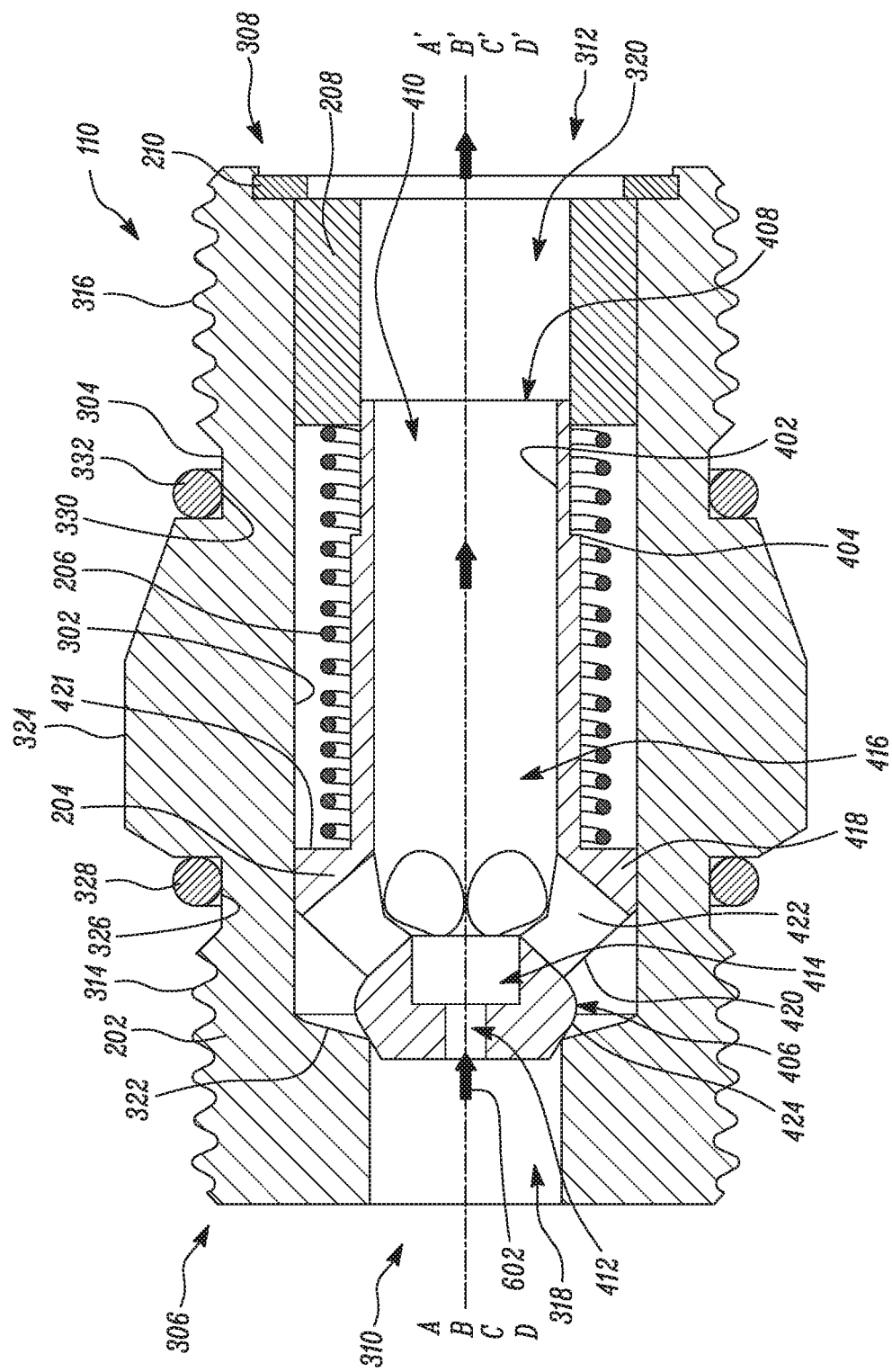
FIG. 6 is a cross sectional view of the regulator assembly of FIG. 5 along a section 3-3' in a closed position thereof, according to one embodiment of the present disclosure.
Figure 7:
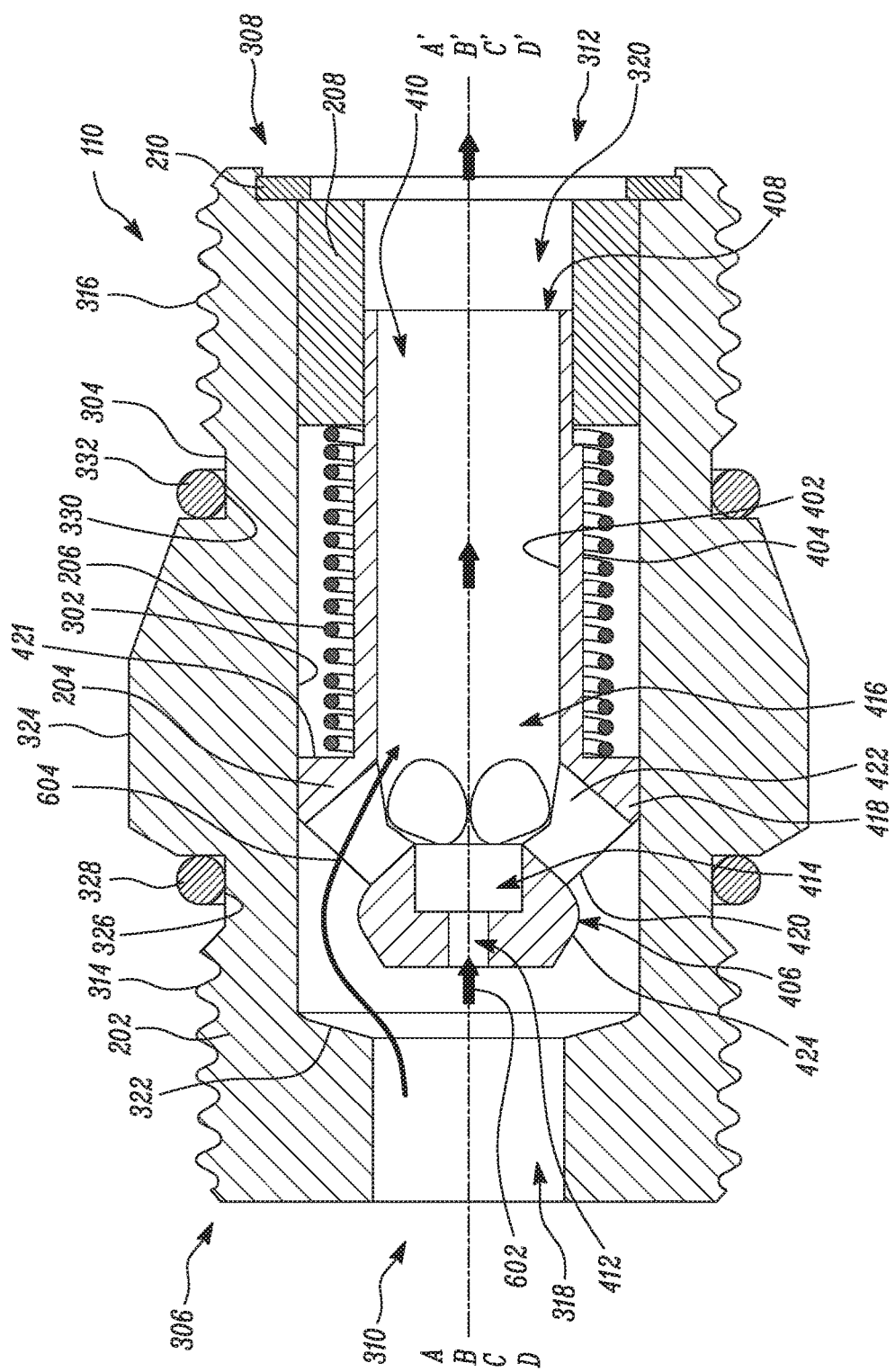
FIG. 7 is a cross sectional view of the regulator assembly of FIG. 5 along the section 3-3' in an open position thereof, according to one embodiment of the present disclosure.

Referring to FIGS. 5, 6 and 7, different views of the regulator assembly 110 in an assembled position thereof are illustrated. In the assembled position, the valve element 204 is disposed within the main body 202. More specifically, the second passage 320 of the main body 202 accommodates the valve element 204 therein. Accordingly, the axis A-A' of the valve element 204 is axially aligned with respect to the axis B-B' of the main body 202.

The valve element 204 is disposed within the second passage 320 in a manner such that the first portion 412 of the internal channel 410 of the valve element 204 is adjacent to the first passage 318 of the main body 202. As such, the first passage 318 of the main body 202 is axially aligned and provided in fluid communication with the internal channel 410 of the valve element 204.

Accordingly, the internal channel 410 continuously provides fluid communication between the inlet portion 310 and the outlet portion 312 of the first end 306 and the second end 308 of the main body 202 respectively. Also, the valve element 204 is provided within the second passage 320 such that the angled surface 424 of the head portion 406 is adjacent to the seat 322 provided on the inner surface 302 of the main body 202.

Also, the spring element 206 is disposed within the second passage 320. The spring element 206 is axially aligned with respect to the main body 202 and the valve element 204. More specifically, the spring element 206 is provided in contact with the second surface 421 of the projection 418 of the head portion 406 the valve element 204. The spring element 206 is disposed between the inner surface 302 of the main body 202 and the outer surface 404 of the valve element 204. The spring element 206 moves the valve element 204 within the second passage 320 along the axis A-A'. More specifically, the spring element 206 biases the valve element 204 towards the inlet portion 310 of the main body 202.

Further, the end piece 208 is disposed within the second passage 320. The end piece 208 is disposed between the inner surface 302 of the main body 202 and the outer surface 404 of the tail portion 408 of the valve element 204. The end piece 208 is provided in contact with the spring element 206 and provides a seat for the spring element 206. The end piece 208 also limits movement of the valve element 204 towards the outlet portion 312 of the main body 202 in order to hold the spring element 206 within the second passage 320. Additionally, the retention ring 210 is disposed within the second passage 320. The retention ring 210 is provided in contact with the end piece 208. The retention ring 210 limits movement of the end piece 208 outside the second passage 320 through the outlet portion 312 of the main body 202 in order to hold the retention ring 210 within the second passage 320.

INDUSTRIAL APPLICABILITY

The present disclosure relates to the regulator assembly 110. Referring to FIG. 6, a cross sectional view of the regulator assembly 110 in a closed position thereof is illustrated. The regulator assembly 110 may be maintained in the closed position during a low working condition of the lubrication system. The low working condition may relate to a low pressure or low flow rate condition of the lubricant through the fluid line 108. Actual values of the low working condition may vary based on application requirements.

In the closed position, the valve element 204 is biased towards the inlet portion 310 by the spring element 206. More specifically, the head portion 406 of the valve element 204 engages at the angled surface 424 thereof with the seat 322 provided on the inner surface 302 of the main body 202. Accordingly, direct fluid communication between the apertures 422 and the first passage 318 is discontinued. Also, in the closed position, as shown by an arrow 602, the first passage 318 continues to be in fluid communication with the internal channel 410, thus providing a limited flow of the lubricant through the regulator assembly 110.

Referring to FIG. 7, a cross sectional view of the regulator assembly 110 in an open position thereof is illustrated. The regulator assembly 110 may be maintained in the open position during a high working condition of the lubrication system. The high working condition may relate to a high pressure or high flow rate condition of the lubricant through the fluid line 108. Actual values of the high working condition may vary based on application requirements.

During the high working condition, the high pressure of the lubricant acting on the head portion 406 and/or the projection 418 of the valve element 204 move the valve element 204 towards the outlet portion 312 by compressing the spring element 206. More specifically, the angled surface 424 of the valve element 204 is moved away with respect to the seat 322 provided on the inner surface 302 of the main body 202. Accordingly, the apertures 422 of the valve element 204 are in direct fluid communication with the first passage 318 of the main body 202 based on the movement of the valve element 204 within the second passage 320 of the main body 202.

More specifically, as shown by an arrow 604, the lubricant flows directly from the first passage 318 towards the apertures 422 and further in to the third portion 416 of the internal channel 410 via the apertures 422 in turn providing increased flow of the lubricant through the regulator assembly 110 when the valve element 204 is not in contact with the seat 322. Also, in the open position, as shown by the arrow 602, the first passage 318 continues to be in fluid communication with the internal channel 410, thus providing the flow of the lubricant through the regulator assembly 110.

The regulator assembly 110 provides a simple, efficient, and cost effective method of controlling the flow of the lubricant via the fluid line 108 based on different working conditions. The regulator assembly 110 may be easily modified for different flow or working parameters based on dimensions of the various components of the regulator assembly 110, such as the main body 202, the valve element 204, number and size of the apertures 422, amount of travel of the valve element 204 within the main body 202, design parameters of the spring element 206, and so on.

The regulator assembly 110 provides an in-line device that varies the flow of the lubricant therethrough based on an upstream pressure and a downstream pressure. The pressure differential is provided by a restriction presented by the position of the valve element 204 with respect to the seat 322 of the main body 202. The regulator assembly 110 may be calibrated for different applications based on a viscosity and a temperature of a working fluid, such as the lubricant.

More specifically, one or more of the different diameters, such as "D", "PD1", "PD2", "VD", "DH" "DP", "DC1", "DC2", "DC3", "ID", and "OD"; one or more of the different lengths, such as, "L", "PL1", "PL2", "VL", "LC1", "LC2", "LC3"; one or more of the different angles, such as "A1", "A2", "A3", and "A4"; and/or one or more parameters of the spring element 206, such as a stiffness thereof may be modified in order to achieve a desired performance of the regulator assembly 110 and provide a required flow/pressure of the fluid to downstream components based on application requirements.

The regulator assembly 110 provides a multi stage flow, such as a regulated flow, a partial flow, and a full flow. More specifically, as shown in FIG. 6, the regulator assembly 110 provides the regulated flow through the first passage 318 and the internal channel 410 in the closed position of the regulator assembly 110. Also, as shown in FIG. 7, the regulator assembly 110 provides the full flow through the first passage 318, the apertures 422, and the internal channel 410 in the open position of the regulator assembly 110.

Further, the regulator assembly 110 provides the partial flow through the first passage 318, the apertures 422, and the internal channel 410 when the regulator assembly 110 may be maintained between the closed position and the open position thereof. An amount of the partial flow may vary based on a distance between the seat 322 and the angled surface 424 of the head portion 406 of the valve element 204. The regulator assembly 110 may be retrofitted in any fluid delivery system with little or no modification to the existing system, without requiring any complicated assembling or mounting methods.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of the disclosure. Such embodiments should be understood to fall within the scope of the present disclosure as determined based upon the claims and any equivalents thereof.

What is claimed is:

1. A regulator assembly comprising:
   a main body including:
      a first end;
      a second end distal with respect to the first end;
      a first passage extending from the first end at least partially towards the second end;
      a second passage axially aligned with, connected to, and extending from the first passage towards the second end, the second passage having a diameter greater than a diameter of the first passage; and
      a seat defined at an intersection of the first passage and the second passage,
      wherein the main body is configured to be coupled to a fluid line at the first end and the second end;
   a valve element configured to be disposed within the second passage of the main body, the valve element configured to move within the second passage, the valve element including:
      a head portion configured to engage with the seat of the main body, the head portion further including a projection having a first surface and a second surface, the projection including a plurality of apertures provided through the first surface;
      a tail portion distal with respect to the head portion; and
      an internal channel extending between the head portion and the tail portion, the internal channel configured to provide fluid communication between the head portion and the tail portion, the internal channel provided in fluid communication with the plurality of apertures; and
   a spring element provided within the second passage and in contact with the second surface of the projection of the head portion, the spring element configured to move the valve element within the second passage,
   wherein direct fluid communication between the plurality of apertures of the valve element and the first passage of the main body is discontinued when the head portion is in contact with the seat, and
   wherein the plurality of apertures of the valve element are in direct fluid communication with the first passage of the main body when the valve element is not in contact with the seat.

2. The regulator assembly of claim 1, wherein the first surface is inclined at an acute angle with respect to a central axis passing through the internal channel of the valve element.

3. The regulator assembly of claim 1, wherein the head portion of the valve element includes a circumferentially provided angled surface, the angled surface configured to contact the seat of the main body.

4. The regulator assembly of claim 1, wherein a diameter of the head portion of the valve element is greater than the diameter of the first passage of the main body.

5. The regulator assembly of claim 1, wherein the seat is defined at a location proximate to the first end of the main body at which the first passage graduates into the second passage.

6. The regulator assembly of claim 1, wherein a length of the valve element is smaller than a length of the second passage.

7. The regulator assembly of claim 1 further comprising an end piece configured to be disposed within the second passage, the end piece configured to contact the spring element and hold the spring element within the second passage.

8. The regulator assembly of claim 7 further comprising a retention ring configured to be disposed within the second passage, the retention ring configured to contact the end piece and hold the end piece within the second passage.

9. The regulator assembly of claim 1 further comprising a sealing ring configured to be disposed on an outer surface of the main body.

10. The regulator assembly of claim 1 further comprising threads provided on an outer surface of the main body, the threads configured to couple the first end and the second end of the regulator assembly to the fluid line.

11. A lubrication system comprising:
a fluid line configured to allow a flow of a lubricant therethrough; and
a regulator assembly provided in the fluid line, the regulator assembly comprising:
a main body including:
a first end;
a second end distal with respect to the first end;
a first passage extending from the first end at least partially towards the second end;
a second passage axially aligned with, connected to, and extending from the first passage towards the second end, the second passage having a diameter greater than a diameter of the first passage; and
a seat defined at an intersection of the first passage and the second passage,
wherein the main body is configured to be coupled to the fluid line at the first end and the second end;
a valve element configured to be disposed within the second passage of the main body, the valve element configured to move within the second passage, the valve element including:
a head portion configured to engage with the seat of the main body, the head portion further including a projection having a first surface and a second surface, the projection including a plurality of apertures provided through the first surface;
a tail portion distal with respect to the head portion; and
an internal channel extending between the head portion and the tail portion, the internal channel configured to provide fluid communication between the head portion and the tail portion, the internal channel provided in fluid communication with the plurality of apertures; and
a spring element provided within the second passage and in contact with the second surface of the projection of the head portion, the spring element configured to move the valve element within the second passage,
wherein direct fluid communication between the plurality of apertures of the valve element and the first passage of the main body is discontinued when the head portion is in contact with the seat, and
wherein the plurality of apertures of the valve element are in direct fluid communication with the first passage of the main body when the valve element is not in contact with the seat.

12. The lubrication system of claim 11, wherein the first surface is inclined at an acute angle with respect to a central axis passing through the internal channel of the valve element.

13. The lubrication system of claim 11, wherein the head portion of the valve element includes a circumferentially provided angled surface, the angled surface configured to contact the seat of the main body.

14. The lubrication system of claim 11, wherein a diameter of the head portion of the valve element is greater than the diameter of the first passage of the main body.

15. The lubrication system of claim 11, wherein the seat is defined at a location proximate to the first end of the main body at which the first passage graduates into the second passage.

16. The lubrication system of claim 11, wherein a length of the valve element is smaller than a length of the second passage.

17. The lubrication system of claim 11 further comprising an end piece configured to be disposed within the second passage, the end piece configured to contact the spring element and hold the spring element within the second passage.

18. The lubrication system of claim 17 further comprising a retention ring configured to be disposed within the second passage, the retention ring configured to contact the end piece and hold the end piece within the second passage.

19. The lubrication system of claim 11 further comprising a sealing ring configured to be disposed on an outer surface of the main body.

20. An engine system comprising:
an engine;
a fluid line for the engine;
a regulator assembly provided within the fluid line, the regulator assembly comprising:
a main body including:
a first end;
a second end distal with respect to the first end;
a first passage extending from the first end at least partially towards the second end;
a second passage axially aligned with, connected to, and extending from the first passage towards the second end, the second passage having a diameter greater than a diameter of the first passage; and
a seat defined at an intersection of the first passage and the second passage,
wherein the main body is configured to be coupled to the fluid line at the first end and the second end;
a valve element configured to be disposed within the second passage of the main body, the valve element configured to move within the second passage, the valve element including:
a head portion configured to engage with the seat of the main body, the head portion further including a projection having a first surface and a second surface, the projection including a plurality of apertures provided through the first surface;
a tail portion distal with respect to the head portion; and an internal channel extending between the head portion and the tail portion, the internal channel configured to provide fluid communication between the head portion and the tail portion, the internal channel provided in fluid communication with the plurality of apertures; and a spring element provided within the second passage and in contact with the second surface of the projection of the head portion, the spring element configured to move the valve element within the second passage, wherein direct fluid communication between the plurality of apertures of the valve element and the first passage of the main body is discontinued when the head portion is in contact with the seat, and wherein the plurality of apertures of the valve element are in direct fluid communication with the first passage of the main body when the valve element is not in contact with the seat.

* * * * *